No. 704,543. Patented July 15, 1902.

E. B. JACOBSON.

ELECTRICAL MEASURING INSTRUMENT.

(Application filed Feb. 11, 1902.)

(No Model.)

Witnesses:
Wm. H. Varnum.
C. S. Miller.

Inventor:
Edward B. Jacobson
by Henry J. Miller
Atty.

UNITED STATES PATENT OFFICE.

EDWARD B. JACOBSON, OF PITTSFIELD, MASSACHUSETTS, ASSIGNOR TO THOR H. NEILSEN, OF BOSTON, MASSACHUSETTS.

ELECTRICAL MEASURING INSTRUMENT.

SPECIFICATION forming part of Letters Patent No. 704,543, dated July 15, 1902.

Application filed February 11, 1902. Serial No. 93,607. (No model.)

*To all whom it may concern:*

Be it known that I, EDWARD B. JACOBSON, a citizen of the United States, residing at Pittsfield, in the county of Berkshire and State of Massachusetts, have invented certain new and useful Improvements in Electrical Measuring Instruments, of which the following is a specification, reference being had therein to the accompanying drawings.

This invention relates to improvements in machines for measuring the intensity and potential of electric circuits.

The object of the invention is to provide a simple portable "voltameter," so called.

Another object of the invention is to so construct a measuring or testing instrument for electrical circuits that the voltage and amperage of electric circuits may be readily ascertained from a single instrument and by the changing of a single connection.

Another object of the invention is to improve the general construction of small voltameters.

The invention consists in the spools having the windings, the terminals, together with the scale and its indicator, and the means for actuating the indicator under the influence of electric current passing through either of said windings.

The invention also consists in such other novel features of construction and combination of parts as shall hereinafter be more fully described, and pointed out in the claims.

Figure 1:
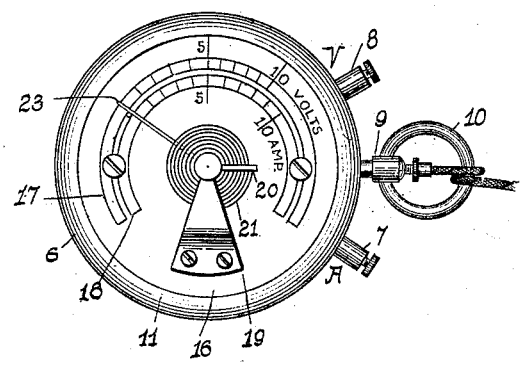
Figure 2:
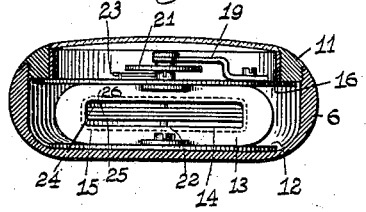
Figure 3:
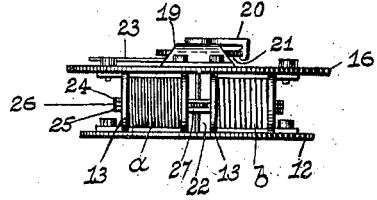
Figure 4:
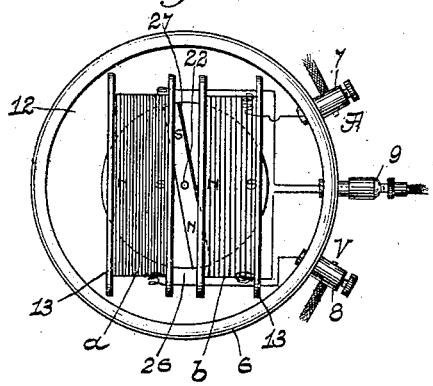
Figure 5:
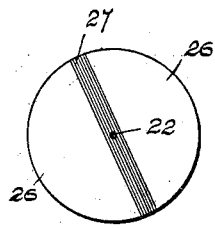

Figure 1 represents a front elevation of the improved instrument approximately in full size. Fig. 2 represents a cross-sectional view of the case, showing a side elevation of one of its magnet-spools. Fig. 3 represents a view of the mechanism removed from its case, taken at right angles to Fig. 2 and showing the spools in end elevation. Fig. 4 represents a plan view in reverse to Fig. 1, part of the case being removed to more clearly show the spools, their windings, and the connections between the windings and the terminals or binding parts, the permanent magnet being shown in full. Fig. 5 represents a plan view of the permanent magnet-disk, one of its layers being removed to show the magnet.

Similar characters of reference designate corresponding parts throughout.

In the drawings, 6 represents a case constructed of any suitable material and of any convenient size. In the wall of the case are secured the terminals or binding-posts 7, 8, and 9, which extend into the case, the terminal 9 being supplied with the ring 10. The open side of the case is preferably closed by a cover 11, having a transparent portion through which the deflection of the indicator can be observed; but this is not essential.

Within the case is the base-plate 12, to which the electromagnets $a$ and $b$ are secured. Each of these electromagnets comprises two sides 13 13, having rectangular openings, as 14, Fig. 2, and connected together by a box-shaped core, (indicated in dotted lines in said figure and designated by the reference-numeral 15.) The spools are arranged side by side on the plate 12 after having previously been wound with insulated wire, and will hereinafter be referred to as "electromagnets $a$ and $b$," it being understood that such reference includes the spools.

The magnet $a$ is wound in series with insulated wire of comparatively small cross-sectional area, but of high resistance electrically, the end portions of this wire being connected to the inner ends of the terminals 8 and 9, while the winding of the magnet $b$ consists of wire of relatively large area and proportionately small resistance to the passage of an electric current, the coils of this winding for the magnet $b$ being laid approximately parallel to each other, and the ends of the wire are connected to the terminals 7 and 9.

Above the magnets $a$ and $b$ is mounted the dial-plate 16, carrying the scales 17 and 18 and the bracket 19, furnished with the arm 20, in which one end of the resistance-spring 21 is secured. This bracket has also a bearing, in which the upper end of the indicator-shaft 22 works, the shaft extending through a perforation in the dial-plate and being journaled in a bearing in the plate 12. On this shaft is coiled the resistance-spring 21, the inner end of the spring being secured to the shaft, and from the shaft extends the indicator 23, which under the rotative motion of the shaft 22 works over the scales 17 and 18. To that portion of the shaft 22 opposite the openings 15 of the electromagnets is fixed a compound disk comprising upper and lower disks 24 and 25 and intermediate segmental portions 26 26, between which is located the permanent magnet 27, the diameter of this disk being such that it can readily work in the openings 15 of the electromagnets, as the shaft 22 is rotated by the attraction or repulsion of the poles of the permanent magnet 27 by such electromagnets under the influence of an electric current passing through the windings of the particular magnet.

After suitable calibration with some standard instrument as to what intensity and potential of electric current particular deflections of the permanent magnet and its indicator will correspond the instrument is in operative condition.

By the connection of the terminals 7 and 9 to the poles of an electric circuit the current from such circuit passes through the windings of the magnet $b$ and causes the deflection of the permanent magnet 27 proportionately to the intensity of the current thus passing, and such deflections are shown by the traveling of the indicator 23 being read on the scale 18 and read in amperes.

The connection of the terminals 8 and 9 to the poles of the electric circuit directs the electric current through the windings of the electromagnet $a$, and the permanent magnet 27 is then deflected in proportion to the potentiality of the current and the resistance offered thereto by the windings, this potentiality being indicated by the position of the indicator 23 on the scale 17 and being read in volts.

The open centers of the electromagnets permit of the deflection of the permanent magnet therein and also allow a circulation of air, whereby the temperature of the magnet-windings is maintained at a degree conducive to accurate measurement and overcoming the fault of increased resistance in said wires through increased temperature.

Having thus described my invention, I claim as new and desire to secure by Letters Patent—

1. An instrument for measuring the intensity and potential of electric circuits and comprising a pair of electromagnets, the respective circuits of which are connected at one end to a single terminal, and at the other end with an independent terminal.

2. An instrument for measuring electrical current comprising the electromagnets $a$ and $b$, constructed as described, and having the negative ends of their coils connected to a single terminal, and the positive ends of their coils connected to independent terminals.

In testimony whereof I affix my signature in presence of two witnesses.

EDWARD B. JACOBSON.

Witnesses:
W. STANLEY CAMPBELL,
H. J. MILLER.